Nov. 20, 1962 W. E. ESTELLE 3,065,409
THERMISTOR MOUNTING
Original Filed Nov. 5, 1953

INVENTOR
Weems E. Estelle
BY
Peck & Peck
ATTORNEYS

United States Patent Office 3,065,409
Patented Nov. 20, 1962

3,065,409
THERMISTOR MOUNTING
Weems E. Estelle, West Redding, Conn., assignor to McNab, Incorporated, New York, N.Y., a corporation of New York
Original application Nov. 5, 1953, Ser. No. 390,348, now Patent No. 2,922,105, dated Jan. 19, 1960. Divided and this application July 21, 1959, Ser. No. 828,515
1 Claim. (Cl. 324—30)

This application is a division of my application Serial No. 390,348 filed November 5, 1953, for Conductivity Cell, and now Patent No. 2,922,105.

This invention relates broadly to the art of measuring the electrical conductivity of liquids and the like and in its more specific aspects it relates to a temperature compensating means of unique construction which is adapted to be removably mounted in an electrical measuring instrument, for instance, a conductivity cell; and the nature and objects of the invention will be readily recognized and understood by those skilled in the arts to which it relates in the light of the following explanation and detailed description of the accompanying drawings illustrating what we at present believe to be preferred embodiments or mechanical expressions of our invention from among various other forms, arrangements, combination and constructions, of which the invention is capable within the spirit and scope thereof.

Temperature compensating means, such as thermistors, which are adapted to be associated with a conductivity cell are so mounted that they are subjected to substantially the same temperatures as the electrodes of the cell. In many conductivity cells the thermistor is mounted within a housing in a body of silicone oil which is a good heat transfer agent. However, this prior method of mounting the compensating means in a body of silicone oil is objectionable for a variety of reasons.

I have overcome these objections by molding the thermistor or compensator in a plastic which is a better conductor of heat than silicone oil. For instance, I may use an epoxy resin which has excellent thermal conduction characteristics. When the compensator element is mounted and arranged in the manner to be described hereinafter the elments will not rattle as in former designs and I provide substantially better heat conduction characteristics.

It has been one of my objects to provide my novel type thermistor for easy mounting and removal from the housing of a conductivity cell. This is highly advantageous because it provides for easy and quick replacement of the thermistor units in a conductivity cell.

With the foregoing general objects, features and results in view, as well as certain others which will be apparent from the following explanation, the invention consists in certain novel features in design, construction, mounting and combination of elements, as will be more fully and particularly referred to and specified hereinafter.

Figure 1:
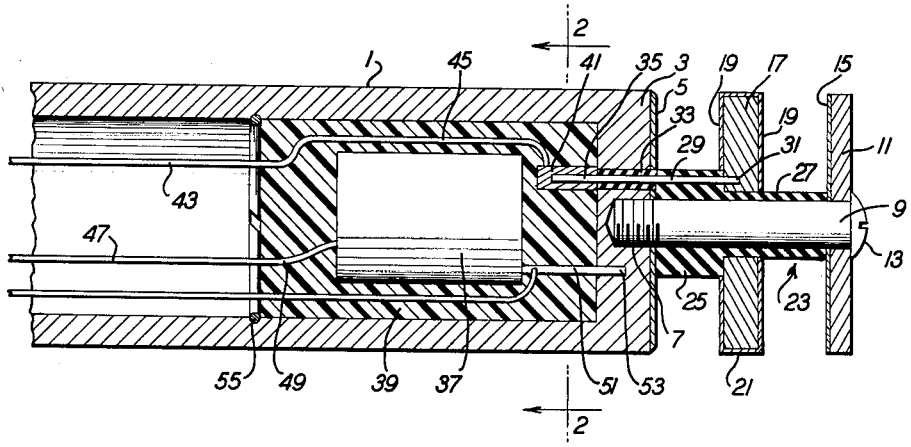
FIG. 1 is a view in longitudinal section of a conductivity cell having the thermistor of this invention mounted therein.
Figure 2:
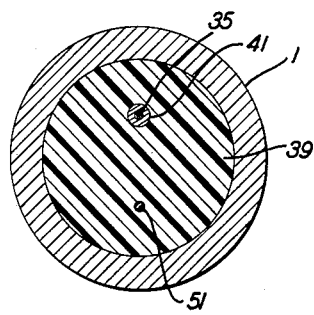
FIG. 2 is a view taken on line 2—2 of FIG. 1.

In the accompanying drawings I have illustrated one form of conductivity cell with which my thermistor may be combined to compensate for temperature changes in the liquid being tested. It is to be distinctly understood that I do not intend to limit my invention for use with the type of conductivity cell illustrated in the drawings for it may be used with any type of cell which includes a housing or the like as one component thereof.

In the example illustrated the conductivity cell includes a cylindrical housing 1 which may be formed of brass or other suitable electrical conductive material. The housing 1 is formed with a thickened forward electrode forming wall 3 having a coating of platinum 5 applied to its outer surface. This forward wall is formed with a threaded socket 7 formed therein and a stud 9 is screwed therein to project forwardly from the wall 3. The stud 9 is formed of brass or other suitable electrical conductive material.

A circular electrode 11 is mounted on the outer end of the stud and is maintained thereon against forward movement by means of head 13 which is formed on the stud. The inner surface of the disc electrode 11 is coated with platinum or the like 15.

Intermediate the two electrodes 3 and 11 which constitute the ground electrodes I mount a "hot" or electrically charged electrode 17 which is mounted on and supported by the stud 9.

The electrically charged electrode 17 is of circular disc like configuration and is preferably of substantially the same diameter as the outer ground electrode 11. This center or electrically charged electrode 17 has its two opposite circular faces coated with platinum or the like suitable material 19. I may also if found desirable and advantageous coat the annular periphery of the electrode 17 with an insulating material 21.

The projecting post or stud 9 is sheathed or encased throughout its length by an insulating sleeve designated generally by the numeral 23. The inner length of this sleeve which extends between the platinum covered operative face 5 of the electrode forming wall 3 and face 19 of electrode 17 is radially thickened as at 25 relative to that portion 27 of the insulating sleeve 23 which extends forwardly from the thickened portion thereof through an opening in the center electrode 17 to thereby insulate said electrode from the projecting metallic stud.

I provide a wire lead 29 which exends into an opening provided in the center electrode 17 as at 31 so that the lead may be soldered or otherwise electrically connected to said electrode. This wire lead extends through the radially thickened portion 25 of the sleeve 23 and in sealed relation thereto, and the lead extends rearwardly through the electrode forming wall 3 and the operative face 5 thereof and is encased and sealed within an insulating jacket 33 so that the opening through the electrode wall 3 and its operative face 5 is effectively sealed against entry of liquid thereinto and the lead is insulated from the electrode forming wall 3. The rearward end 35 of the lead for the electrically charged electrode 17 projects rearwardly beyond the rear wall of electrode forming wall 3 for a purpose to be hereinafter explained.

I have devised a highly advantageous compensator or thermistor mounting arrangement to provide for easy removal of the compensator from its operative position within the housing 1 and to also provide for the necessary heat conduction to the compensator so that it will operate efficiently and function properly in the entire indicating apparatus.

The compensator is designated by the numeral 37 and this compensator is disposed within a plastic jacket or casing 39 which is molded thereabout to provide a compact unitary body. The plastic forming the casing 39 for the compensator 37 is one having good heat conduction characteristics, and one example of such a plastic is an epoxy resin which is a substantially better heat transfer agent than is silicone oil which is now commonly used with compensators in conductivity cells. The dimensions of the plastic casing or body 39 are such that the entire unit involving the enclosed compensator 37 and its plastic case 39 have a sliding fit within the housing and will snugly fit within the housing 1 for removal therefrom when necessary. The plastic casing 39 is provided with a pin receiving electric connector socket 41 extending inwardly a distance from the forward surface of the plastic body. An electrical lead 43 extends from the electric circuit of the system through the housing and is molded within the plastic body 39 as at 45 to extend therethrough to make an electrical contact with the electric connector socket 41. It will now be apparent that the compensator unit when operatively disposed in the housing will be in such position that projecting pin portion 35 of lead 29 will project into the electric socket 41 to thereby connect electrode 17 into the electric circuit. A compensator lead 47 extends through the housing and is molded within the plastic case as at 49 to connect the compensator or thermistor into the circuit. The compensator is electrically connected to the ground electrodes 3 and 11 by means of a pin connection 51 which extends forwardly from the compensator and through the plastic body for removable seating as at 53 in a recess which is formed in the ground or electrode forming wall 3 for electrical contact therewith. The pin may, if desired, be soldered in the recess. I preferably provide a circumferential groove 55 which is formed in the interior surface of the housing 1 at a point thereon adjacent the rearward end of the plastic body 39 and in order to maintain the compensator unit in operative position removably disposed within the housing, a retaining ring 57 is snapped into the groove 55 for engagement against the rear wall of the compensator unit.

It will now be appreciated that I have devised a compensator or thermistor unit of a compact and unitary nature which is especially adapted for combination with any type of cell which involves a housing member. It will be further appreciated that I have devised a thermistor unit which is potted or packed in a plastic case which is so dimensioned that it may be readily and easily mounted in and removed from the housing of a conductivity cell or the like.

As mentioned above it is not my intention to limit the use of my compensator or thermistor to cells of the type shown in the drawing for this is merely one example from among many cells with which my compensator may be used.

I claim:

A compensator unit adapted to be removably inserted in a housing of a conductivity cell, said unit including a casing formed of a material having a heat transfer characteristic, a compensator, and said casing molded about said compensator, said compensator being sealed within and in heat transfer engagement wtih said casing, said unit being shaped and dimensioned to conform to the shape of the interior of the housing, and said casing being formed with a socket in one end thereof, said socket being lined with an electrically conductive material, an electric conductor in electrical contact with the lining of the socket, said electrical conductor being molded in the casing and extending outwardly beyond and end thereof, and a further electric conductor molded in said casing and one end thereof extending outwardly beyond one end of the casing, an electrically conductive rigid element molded in said casing and extending outwardly beyond the other end of the casing, and the other end of said further electric conductor being in electrical contact with the inner end of said electrically conductive rigid element.

References Cited in the file of this patent

UNITED STATES PATENTS

| | | |
|---|---|---|
| 2,330,394 | Stuart | Sept. 28, 1943 |
| 2,560,209 | Borell et al. | July 10, 1951 |
| 2,686,244 | Dahm et al. | Aug. 10, 1954 |
| 2,922,105 | Estelle | Jan. 19, 1960 |